UNITED STATES PATENT OFFICE.

SAMUEL CABOT, JR., OF BOSTON, MASSACHUSETTS.

IMPROVEMENT IN PROCESSES FOR OBTAINING AMMONIA SALTS.

Specification forming part of Letters Patent No. 193,920, dated August 7, 1877; application filed March 26, 1877.

*To all whom it may concern:*

Be it known that I, SAMUEL CABOT, Jr., of Boston, in the county of Suffolk and State of Massachusetts, have invented certain new and useful Improvements in Processes for Preparing Ammonia Salts; and I do hereby declare the following to be a full, clear, and exact description of the invention, such as will enable others skilled in the art to which it pertains to make and use it.

My invention consists in the process, as hereinafter described, for the production of ammonia salts by the treatment of nitrate or chloride of sodium in solution with the carbonate of ammonia obtained by boiling the ammoniacal liquor from gas-works; it also produces at the same time bicarbonate of soda, which thus becomes a direct product from gas water and salt or nitrate of sodium.

To apply my process practically gas-water, which is a solution consisting principally of carbonate and bicarbonate of ammonia, is heated without lime in any suitable apparatus, the best being, in my opinion, a Coffey's still. The resulting gaseous carbonates of ammonia are passed through cooling-pipes, and finally introduced into the bottom of a tall cylindrical boiler. Into this boiler, also near the bottom, a stream of cooled carbonic-acid gas is passed, which converts any ammonia still remaining unsaturated to bicarbonate of ammonia. From the top of this boiler a fine rain of saturated brine falls, meeting the ascending column of gases, and is converted by them into a mixture of sal-ammoniac and bicarbonate of soda. The gases leave this saturating boiler at the top, and are passed over acid to absorb and save any traces of ammonia that might otherwise escape. The liquid is pumped again and again to the top until there is no further precipitation of bicarbonate of soda on addition of bicarbonate of ammonia to a small sample of the clear liquor. It is then drawn off into another vessel and left to settle. The comparatively insoluble bicarbonate of soda settles out, and may be separated from the liquor by drawing off the latter and then whirling the pasty mass at the bottom in a hydro-extractor, such as is used for the extraction of water from sugar. The liquor contains now large proportions of sal-ammoniac with smaller quantities of bicarbonate of soda and chloride of sodium. The liquor is heated in a boiler connected by cooled pipes with the absorbing-cylinder, and the gaseous bicarbonate of ammonia is thus used again. The remaining liquor contains nothing but chloride ammonium and chloride of sodium. This solution is evaporated down until the common salt crystallizes out by reason of the concentrated nature of the solution. It can be used over again in the process. After the salt is almost entirely gone the liquid may be allowed to cool, whereby the sal-ammoniac is crystallized out, or I have found it better to distill it in a cast-iron pan, as is often done in preparing this substance. In the latter case the salt is left in the bottom of the pan, and may be used to prepare more solutions.

To prepare nitrate of ammonia, precisely the same process is applied to nitrate of sodium, (Chili saltpeter,) except that the ammonia nitrate cannot be sublimed, as can sal-ammoniac; it must, therefore, be separated by crystallization.

Having fully described my invention, what I claim as new, and desire to secure by Letters Patent, is—

1. The process of obtaining salts of ammonia and bicarbonate of soda as independent products, the same consisting in treating volatilized mono-carbonate of ammonia charged with carbonic-acid gas with a fine rain of saline sodiac solution, substantially as and for the purpose described.

2. A process for the manufacture of sal-ammoniac, consisting of the following steps: boiling ammoniacal-gas liquor, cooling the resulting volatilized carbonate of ammonia, charging the same with carbonic-acid gas, and finally spraying the ascending gases under inclosure with saturated brine, substantially as and for the purpose described.

In testimony that I claim the foregoing I have hereunto set my hand this 21st day of March, 1877.

SAMUEL CABOT, JR.

Witnesses:
T. R. SULLIVAN,
JAMES GEDDES.